United States Patent
Irwin

(10) Patent No.: US 6,435,067 B1
(45) Date of Patent: Aug. 20, 2002

(54) APPARATUS AND METHOD FOR REGISTERING ARTICLES DURING A WEB PROCESSING OPERATION

(76) Inventor: Jere F. Irwin, P.O. Box 10668, Yakima, WA (US) 98909-1668

( * ) Notice: Subject to any disclaimer, the term of this patent is extended or adjusted under 35 U.S.C. 154(b) by 0 days.

(21) Appl. No.: 09/575,783

(22) Filed: May 22, 2000

(51) Int. Cl.[7] .................................................. B26D 7/00
(52) U.S. Cl. ............................ 83/228; 83/206; 83/268; 83/418; 83/253; 83/387; 83/945; 83/685; 264/153; 264/160
(58) Field of Search ......................... 83/206, 214, 253, 83/268, 228, 278, 387, 282, 378, 409.2, 418, 419, 421, 446, 914, 685, 440.1, 454, 55, 420, 945; 53/53, 249, 282, 559; 264/551, 153, 163, 554, 145, 160, 544; 425/302.1, 397, 296, 304, 315; 493/167, 242, 250

(56) References Cited

U.S. PATENT DOCUMENTS

| | | | |
|---|---|---|---|
| 3,523,474 A | * 8/1970 | Kinslow, Jr. ................... | 83/40 |
| 3,656,381 A | * 4/1972 | Gilev et al. .................... | 83/133 |
| 3,808,927 A | * 5/1974 | Neil ............................. | 83/228 |
| 4,526,074 A | 7/1985 | Johnson ......................... | 83/97 |
| 4,624,162 A | * 11/1986 | Arnold .......................... | 83/74 |
| 4,687,144 A | 8/1987 | Irwin et al. .................... | 241/49 |
| 4,844,852 A | 7/1989 | Keyser et al. .................. | 264/153 |
| 4,884,484 A | * 12/1989 | Bakermans et al. ........... | 83/145 |
| 4,945,954 A | * 8/1990 | Wehrly, Jr. et al. .......... | 140/105 |
| 5,773,540 A | 6/1998 | Irwin et al. .................... | 425/387.1 |
| 5,806,745 A | 9/1998 | Irwin ............................ | 226/74 |
| 5,836,527 A | 11/1998 | Irwin et al. .................... | 241/49 |
| 5,860,607 A | 1/1999 | Irwin ............................ | 241/80 |
| 5,893,523 A | 4/1999 | Irwin ............................ | 241/60 |
| 5,904,891 A | * 5/1999 | Mizuno ......................... | 264/544 |

* cited by examiner

Primary Examiner—Boyer Ashley
(74) Attorney, Agent, or Firm—Wells St. John P.S.

(57) ABSTRACT

A trim press article handling apparatus includes a punch plate, a die plate, a plunger, and a receiver. The punch plate has a punch, and the die plate has a die cooperating in relative movement with the punch plate to sever articles from a thermoformable web. The plunger is carried by one of the punch plate and the die plate having a tapered advancing head. The receiver is carried by the other of the punch plate and the die plate having a tapered recess configured to receive the plunger. A tapered article locator provided within a thermoformed web also having articles therein is captured between the plunger and the receiver as the punch plate and die plate are brought together there about, thereby imparting alignment of an article in the web between the punch and the die. A method for aligning and severing articles from a web is also provided.

12 Claims, 9 Drawing Sheets

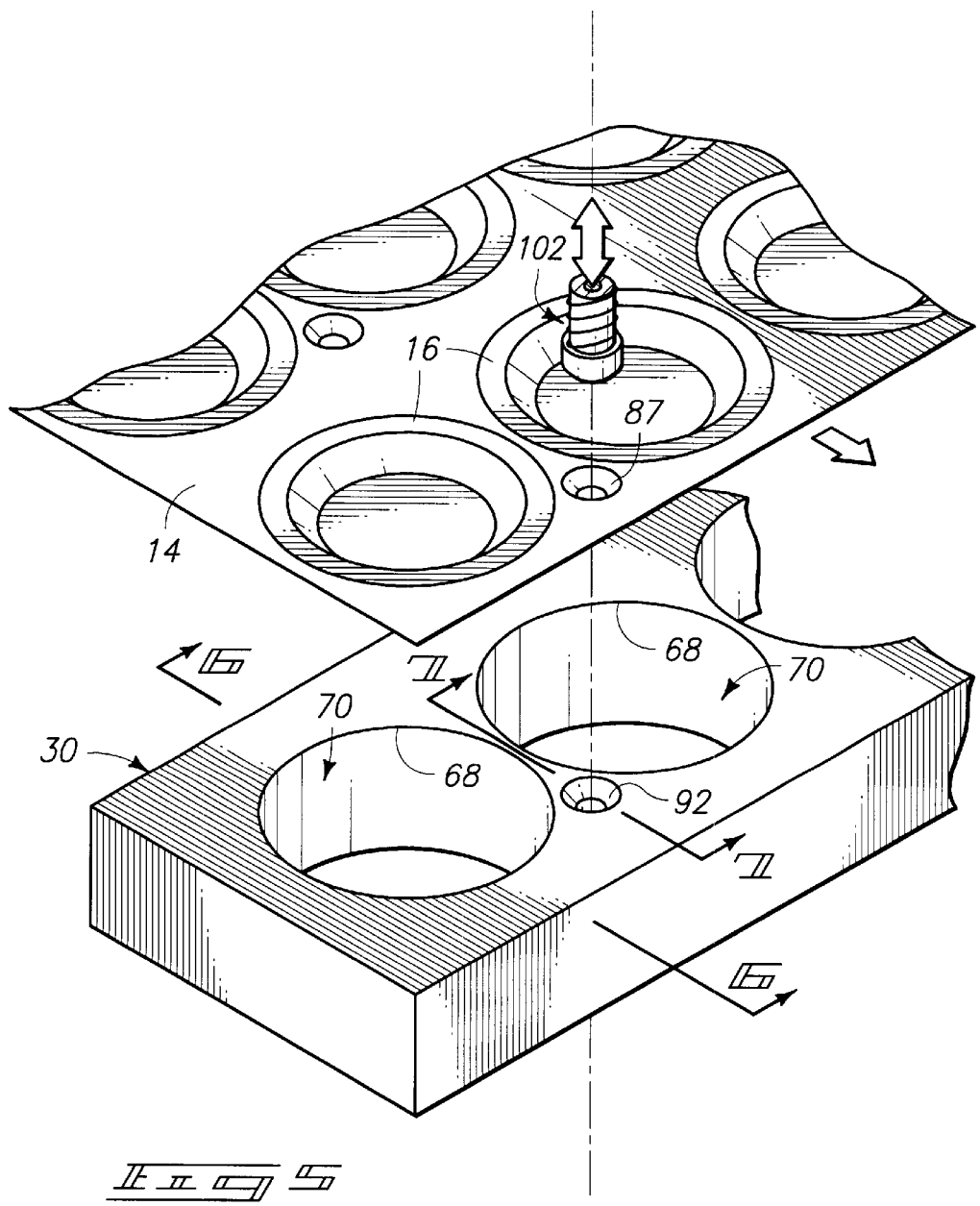

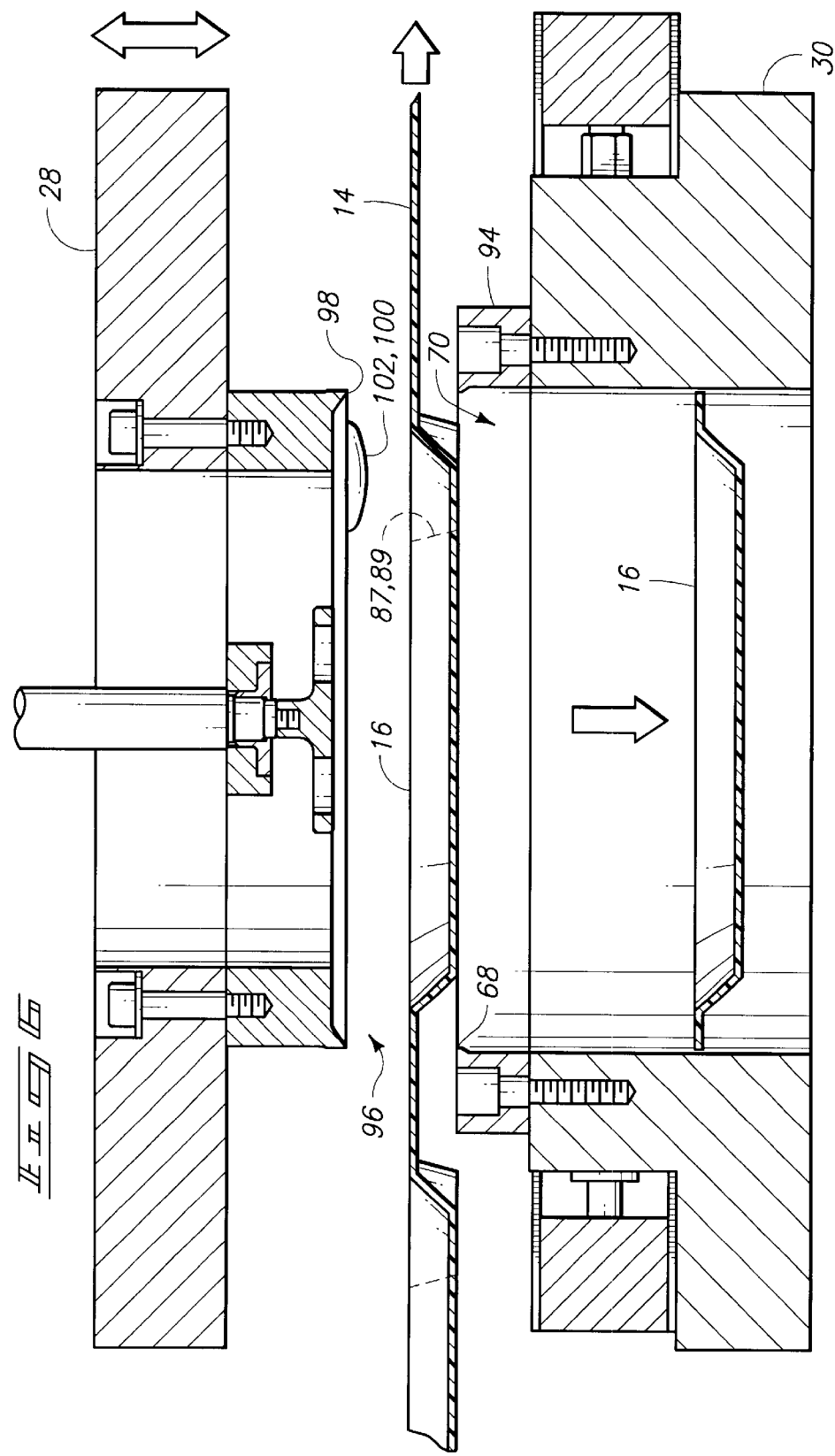

APPARATUS AND METHOD FOR REGISTERING ARTICLES DURING A WEB PROCESSING OPERATION

TECHNICAL FIELD

This invention pertains to an apparatus and method for separating thermoformed thin-walled articles from sheets of plastic or foam material. More particularly, this invention relates to a trim press article handling apparatus such as a web processing article registration device.

BACKGROUND OF THE INVENTION

Various devices are known for trimming thin-walled articles from sheets of thermoformed plastic material. The trimming or severing of such articles from a continuous web or sheet of thermoformable plastic and/or foam material has long been known in the art. For example, U.S. Pat. No. 4,526,074 discloses a high-speed trim press for successively trimming thermoformed articles from a continuous web of thermoformable foam or plastic material. A male locator urges the thermoformed article and web against a cutter in order to trim individual articles from the web. In the process, the articles are retained in a recess within the cutter. Subsequently trimmed articles form a state of nested articles within the recess. However, the cooperating male and female members in such trim press do not necessarily cut with sufficient accuracy, especially during high-speed trim press operations. Accordingly, improvements are needed to enhance the accuracy with which articles are aligned within a trim press such that the articles properly register with individual complementary punches and dies that cooperate to cut articles from a web.

SUMMARY OF THE INVENTION

A device is provided for registering articles, or products, during a web processing operation. More particularly, an article registering device more accurately positions web-supported articles into a trim press prior to and while severing the articles from the web. Such article registering device provides an additional degree of accuracy during such severing operation over that previously provided via adjustment and control of a web conveyor.

According to one aspect, a trim press article handling apparatus includes a punch plate, a die plate, a plunger, and a receiver. The punch plate has a punch, and the die plate has a die cooperating in relative movement with the punch plate to sever articles from a thermoformable web. The plunger is carried by one of the punch plate and the die plate having a tapered advancing head. The receiver is carried by the other of the punch plate and the die plate having a tapered recess configured to receive the plunger. A tapered article locator provided within a thermoformed web also having articles therein is captured between the plunger and the receiver as the punch plate and die plate are brought together there about, thereby imparting alignment of an article in the web between the punch and the die.

According to another aspect, a web processing article registration device includes a first support structure, a second support structure, a plunger, and a receiver. The first support structure has a punch, and the second support structure has a die configured to cooperate with the punch to sever articles from a web of thermoformable material. The plunger is carried by one of the first support structure and the second support structure, and has a tapering, leading head portion. The receiver is carried by another of the first support structure and the second support structure, and has a recess configured to receive the plunger. A tapering article locator and at least one article are provided within a web such that the tapering article locator is captured between the plunger and the receiver as the punch and the die are moved together such that the plunger interacts with the tapering article locator to align the article between the punch and the die to facilitate aligned severing of the article therebetween.

According to yet another aspect, a method is provided for aligning and severing articles from a web of thermoformable material includes: forming at least one article and a tapering recess within a web of thermoformable material; providing a trim press having a punch plate with a punch, a die plate with a die, a plunger carried by one of the punch plate and the die plate, and a receiver carried by the other of the punch plate and the die plate; receiving the formed web between the punch plate and the die plate; aligning the article between the punch and the die by moving the punch plate and the die plate so as to engage the plunger with the tapering recess such that the plunger and the receiver cooperate with the tapering recess to align the article with the punch and the die; and severing the article from the web by coacting the punch and the die while the article is aligned therebetween.

BRIEF DESCRIPTION OF THE DRAWINGS

Preferred embodiments of the invention are described below with reference to the following accompanying drawings.

FIG. 5 is an enlarged, simplified and schematic perspective view illustrating a thermoformed plastic web containing a plurality of thermoformed articles therein and article locator features, and further illustrating cooperation of the components for the article registration device of FIGS. 3 and 4 cooperating to align the articles with punch and die components of the trim press of FIG. 1;

FIG. 6 is a vertical sectional view taken along line 6—6 of FIG. 5 and showing the punch plate and die plate configured to align and sever an article from a web of material;

FIG. 7 is an enlarged and partial vertical cross-sectional view taken along line 7—7 of FIG. 5 illustrating a punch plate and die plate in an open position prior to aligning a web of material and articles formed therein in relation to the punch plate and die plate during a trim press operation;

FIG. 8 is an enlarged and partial vertical cross-sectional view taken along line 7—7 of FIG. 5 corresponding with the view of FIG. 6 showing the punch plate being lowered such that the article registration device moves the web of material into alignment such that corresponding articles are aligned between the punch plate and die plate;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. One exemplary implementation is described below and depicted with reference to the drawings comprising an article registration device and method for aligning and severing articles from a web of thermoformable material. While the invention is described by way of a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
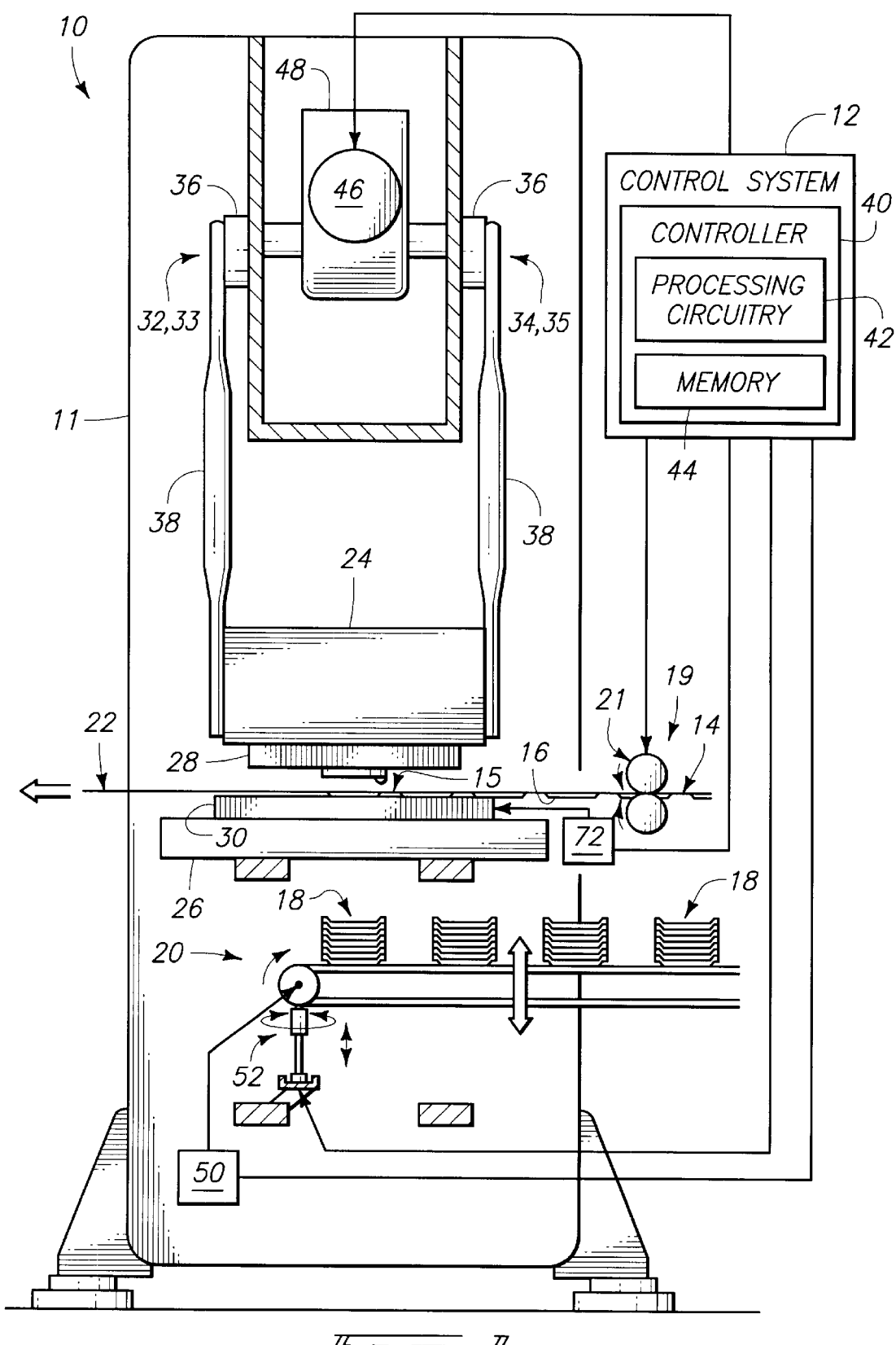
FIG. 1 is a vertical side view of a thermoforming machine trim press having an article registration device embodying one aspect of the invention.

A preferred embodiment of Applicant's invention is shown on a thermoforming machine trim press that is generally designated with reference numeral 10 in FIG. 1. More particularly, an article registration device is provided on trim press 10 to more accurately align articles during severing of the articles from a web. A control system 12 choreographs operation of trim press 10 along with a conveyor 19 in order to move a web 14 of thermoformed plastic material in which individual articles, or products, 16 have earlier been formed using a thermoforming machine (not shown). In operation, web 14 is driven in intermittent motion using control system 12 to intermittently feed individual rows of articles 16 to a reasonably accurate position where the articles 16 are severed from web 14 using trim press 10. During closure of trim press 10, article registration device 15 more accurately position articles 16 with respect to punch and die members just prior to severing the articles 16 from web 14.

An article accumulator 72 is also provided on trim press 10 to accumulate the severed articles 16 into individual stacks 18, which are intermittently deposited atop a stacking conveyor 20 for delivery to a packing machine. Such stacks 18 of articles 16 are then loaded into individual packages or plastic bags.

Further details of article accumulator 72 are provided in Applicant's co-pending U.S. patent application Ser. No. 09/576,219, entitled "Article Stacking Device, Trim Press Article Accumulator, and Method of Stacking Thermoformed Articles", naming Jere F. Irwin as inventor, and filed concurrently herewith. Such U.S. patent application Ser. No. 09/576,219 is herein incorporated by reference.

In order to improve the accuracy with which articles 16 are severed from a web by trim press 10, article registration device 15 is provided on trim press 10 having desired features of Applicant's invention. Article registration device 15 provides highly accurate article registration between punch plate 28 and die plate 30 to ensure that articles 16 are accurately severed from web 14. Accordingly, articles 16 are severed in a highly uniform and centered manner from web 14 such that a uniform flange is provided about such articles when articles 16, for example, comprise plastic plates.

In the absence of Applicant's article registration device 15, article registration is carried out solely by adjusting the positioning of a web conveyor 19, as shown and described below in simplified form. Additionally, a coarse level of article registration is carried out by adjusting the operation of controller 40 in order to adjust the advancement and positioning of individual articles between punch plate 28 and die plate 30.

However, it is oftentimes very difficult to adjust the set-up and component positioning for a web conveyor in order to accurately and precisely deliver articles 16 between punch plate 28 and die plate 30. Hence, article registration implemented solely using conveyor set-up and control does not sever such articles in a sufficiently uniform and accurate manner. Furthermore, there are limitations to the accuracy with which a servo motor can drive web conveyor 19, and therefore, in the ability of such servo motors to accurately place articles 16 between punch plate 28 and die plate 30. Oftentimes, it is the case that articles 16 are off by several millimeters, which can produce an undesirable effect, particularly where article 16 is of a complicated shape, or article 16 comprises a foldable container having a hinge which requires a high degree of accuracy in forming and severing thereof.

Accordingly, article registration device 15, as described below with reference to FIGS. 3–9, provides an enhanced ability to accurately register articles 16 between punch plate 28 and die plate 30 when severing such articles 16 therebetween.

As shown in FIG. 1, web conveyor 19 is illustrated in simplified form as a drive wheel assembly 21 including a servo motor (not shown) that is controllably actuated via control system 12 to impart intermittent motion to web 14. As shown in FIG. 1, drive wheel assembly 21 comprises two pairs of co-acting top and bottom wheels that are provided along opposite side edges of web 14. A topmost wheel of each pair comprises a drive wheel and a bottom-most wheel of each pair comprises a follower wheel that is actuated and driven by a servo motor. Accordingly, actuation of drive wheel assembly 21 via controller 40 is operative to intermittently deliver rows of articles 16 into trim press 10. Such rows of articles 16 are then severed as control system 12 actuates a severing operation via trim press 10. Subsequently, a scrap web 22 is delivered from trim press 10 and ground into small pieces using a comminuting device configured for grinding up scrap web 22, as described below in reference to FIG. 2.

As shown in FIG. 1, drive wheel assembly 21 comprises a dual servo motor driven roller feed assembly. However, it is understood that drive wheel assembly 21 represents a simplified version of a web conveyor for delivering thin web materials into trim press 10. One exemplary detailed construction for a web conveyor is disclosed in U.S. Pat. No. 5,806,745, herein incorporated by reference.

Several different comminuting apparatus suitable for grinding up scrap web 22 are disclosed in U.S. Pat. Nos. 4,687,144; 5,836,527; 5,860,607; and 5,893,523, each herein incorporated by reference. Scrap web 22 is accordingly forwarded into such a recycling, pulverizing machine where web 22 is shredded and then later recycled to form a new web of thermoformable plastic material.

Details of one exemplary thermoforming machine suitable for forming articles 16 within web 14 are disclosed in U.S. Pat. No. 5,773,540. U.S. Pat. No. 5,773,540 is herein incorporated by reference.

Trim press 10 includes a movable upper platen 24, a stationary lower platen 26, a punch plate 28, and a die plate 30. Punch plate 28 is carried for movement by movable upper platen 24, whereas die plate 30 is fixedly carried by stationary lower platen 26. However, it is understood that platen 26 and die plate 30 can also be movably supported for operation according to an alternative construction.

As shown in FIG. 1, upper platen 24 is carried for vertical reciprocation by crank arm assemblies 32–35. Details of one exemplary thermoforming machine suitable for incorporating accumulator 72 and having such crank arm assembly are shown in U.S. patent application Ser. No. 08/691,856, now U.S. Pat. No. 6,067,886, entitled "Machine Trim Press Having Counterbalance Features", and naming the inventor as Jere F. Irwin. Such U.S. Pat. No. 6,067,886 is herein incorporated by reference.

Each crank arm assembly 32–35 comprises a throw arm 36 and a platen connecting rod 38, wherein arm 36 and rod 38 cooperate to form a kinematic linkage that drives a dedicated corner of platen 24 for vertical, guided reciprocation. Additionally, two cylindrical, stationary guide posts (not shown) are rigidly carried by a frame 11 to support platen 24 for movement in an axial, vertical direction. Optionally, only four guide posts can be configured to support platen 24 with two corresponding bushings.

Even furthermore, four additional, stationary guide posts 60–63 (see FIG. 3) are rigidly supported or press fit within apertures 64–67 of die plate 30 to further guide sliding movement of punch plate 28 there along. Bushings 164–167 (of FIG. 3) in punch plate 28 slide over guide posts 60–63. Such platen guide posts (not shown) are understood in the art and have been omitted from the figures in order to simplify the drawing and to prevent obscuring the invention at hand. Furthermore, punch plate/die plate guide posts 60–63 have been eliminated from FIG. 1 to also prevent obscuring the invention at hand.

Control system 12 of FIG. 1 includes a controller 40 having processing circuitry 42 and memory 44. According to one construction, processing circuitry 42 is provided by a central processing unit (CPU). According to another construction, processing circuitry 42 is provided by a microcontroller which cooperates to form controller 40. It is understood that memory 44 is operative to store software subroutines that are retrieved and implemented on processing circuitry 42 in order to impart motion control functionality by way of controller 42 to trim press 10.

As shown in FIG. 1, control system 12 is operative to generate control signals that direct operation of a servo drive motor 46 that drives crank arm assemblies 32–35 and thereby imparts reciprocation to upper platen 24. Servo drive motor 46 comprises a highly accurate computerized servo motor and servo drive which can be accurately driven by control system 12. In operation, servo drive motor 46 drives a gear box 48 that imparts a rotary motion to each of crank arm assemblies 32–35. Furthermore, control system 12 is operative to deliver a control signal to a servo drive motor 50 that advances article conveyor 20. Additionally, control system 12 delivers another control signal to a plurality of linear actuators 52 that raise and lower article conveyor 20 as well as stacks 18 of severed articles 16 during stacking, packaging and/or bagging operations. One suitable linear actuator 52 comprises a plurality of ball screw actuators having electric drive motors. Alternatively, linear actuator 52 comprises a plurality of pneumatic or hydraulic actuators, or pistons, configured to raise and lower article conveyor 20 relative to lower platen 26.

Figure 2:
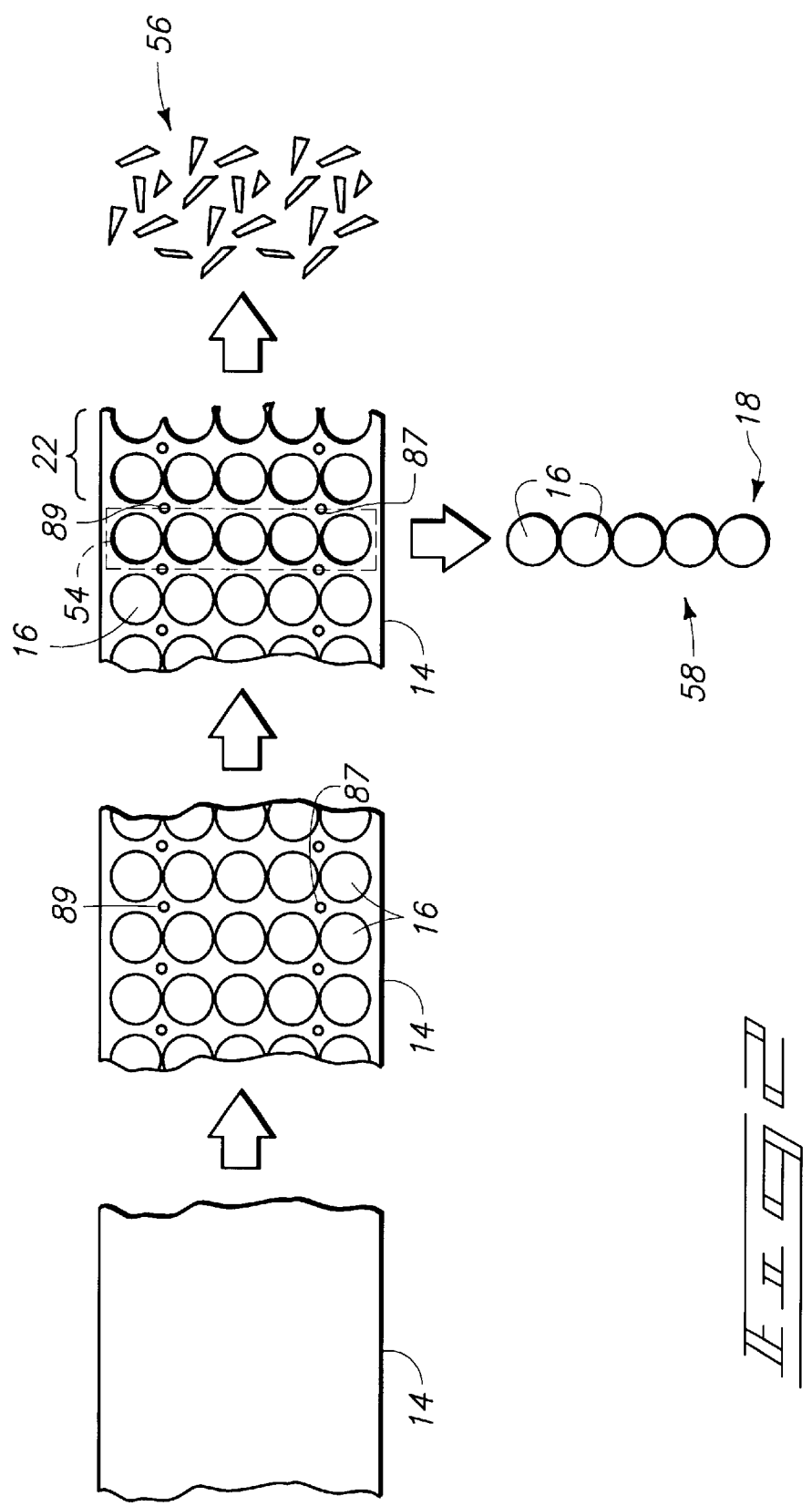
FIG. 2 is a series of illustration views of a sheet of thermoformable plastic material in which articles are formed using a thermoforming machine and from which such articles are trimmed, or severed, aligned, and stacked using the apparatus of FIG. 1.

FIG. 2 illustrates in simplified schematic form the processing of a thermoformable plastic web 14 wherein web 14 is initially heated in an oven after which individual articles 16 are formed in the heated web using a thermoforming machine. Subsequently, rows 54 of articles 16 are successively severed from web 14 and stacked using a trim press 10 (of FIG. 1) having the novel features of Applicant's invention. Pairs of article locators 87 and 89 in web 14 facilitate accurate severing of articles 16 from web 14. Accumulator 72 then stacks successive rows 54 beneath web 14, after which an array 58 of stacks 18 of articles 16 is retrieved from beneath web 14 by activating conveyor 20 (of FIG. 1). Scrap web 22 is progressively advanced forward into a comminuting apparatus as described above, which generates subdivided pieces 56 of a sufficiently small desired size.

Figure 3:
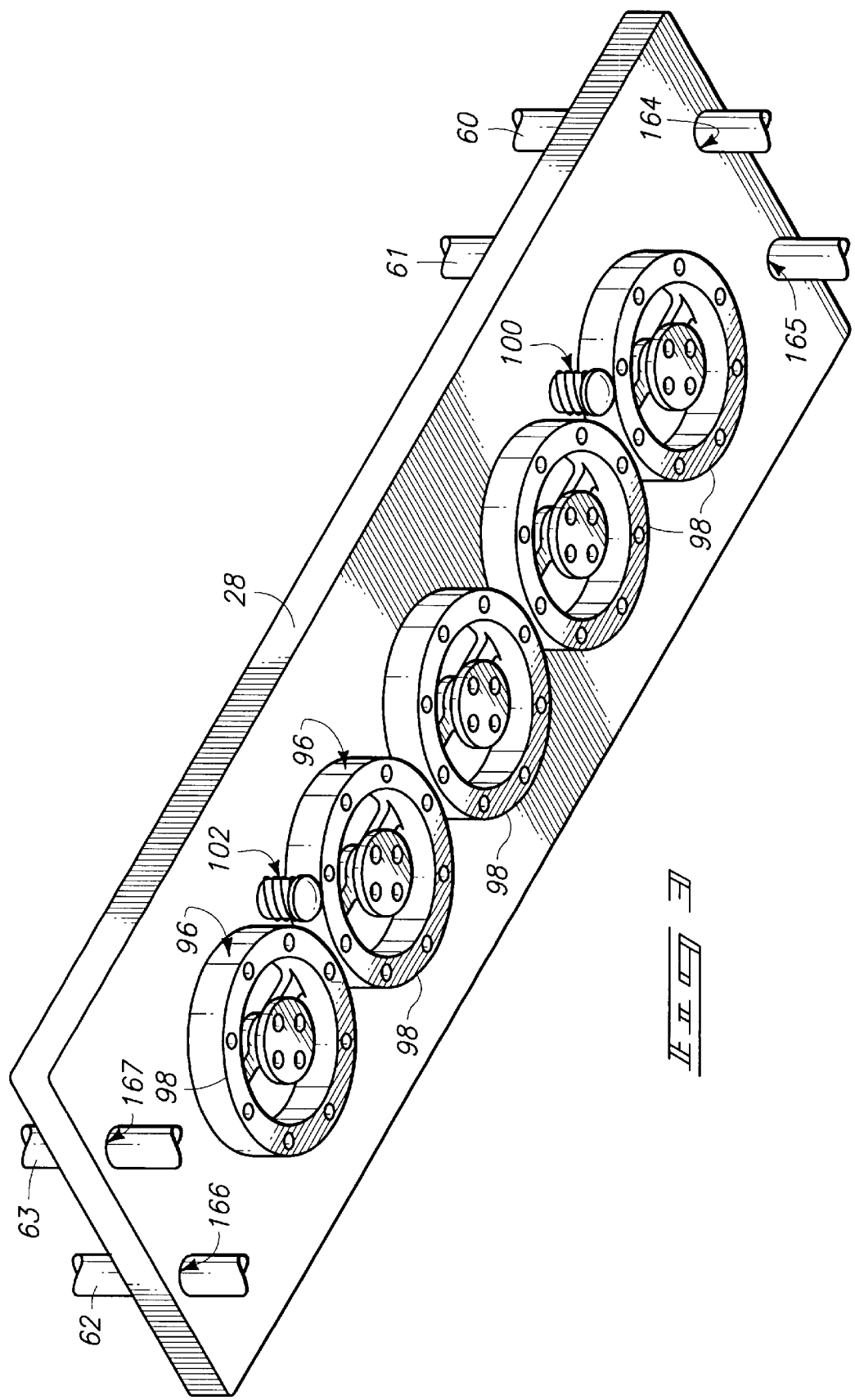
FIG. 3 is a schematic perspective view taken in an upwards direction of a top platen illustrating associated components of the article registration device configured to cooperate with the bottom platen of FIG. 4.

As shown in FIG. 3, punch plate 28 coacts with die plate 30 of FIGS. 4–9 when severing and accumulating articles. Punch plate 28 includes bronze bushings 164–167 that are fitted in slidable engagement over guide posts 60–63, respectively. Accordingly, punch plate 28 is movably supported along guide posts 60–63, and is further driven by crank arm assemblies 32–35 via servo drive motor 46 and gearbox 48 (of FIG. 1). As shown in FIG. 3, a plurality of punches, or male die members, 96 are provided on a bottom surface of punch plate 28. Punches 96 are individually arranged so as to coact with die member 94 of lower platen 26 (of FIG. 4). Accordingly, such coaction between cutting edges 68 and 98 severs articles from a web in an accurate manner as plungers 100 and 102 cooperate with article registration cavities 90 and 92 to center article locators 87 and 89 within web 14 (see FIG. 2), which causes articles 16 in web 14 to also be accurately aligned between punches 96 (see FIG. 3) and corresponding dies present within die member 94 (see FIG. 4). Accordingly, coaction between corresponding cutting edges 98 on each punch 96 (of FIG. 3) and complementary cutting edges 68 of die member 94 (of FIG. 4), in combination with article alignment between plungers 100 and 102 and article locators 87 and 89, ensures accurate severing of articles from a web. Following such severing, such articles are stacked by way of accumulator 72 (see FIG. 1).

Figure 4:
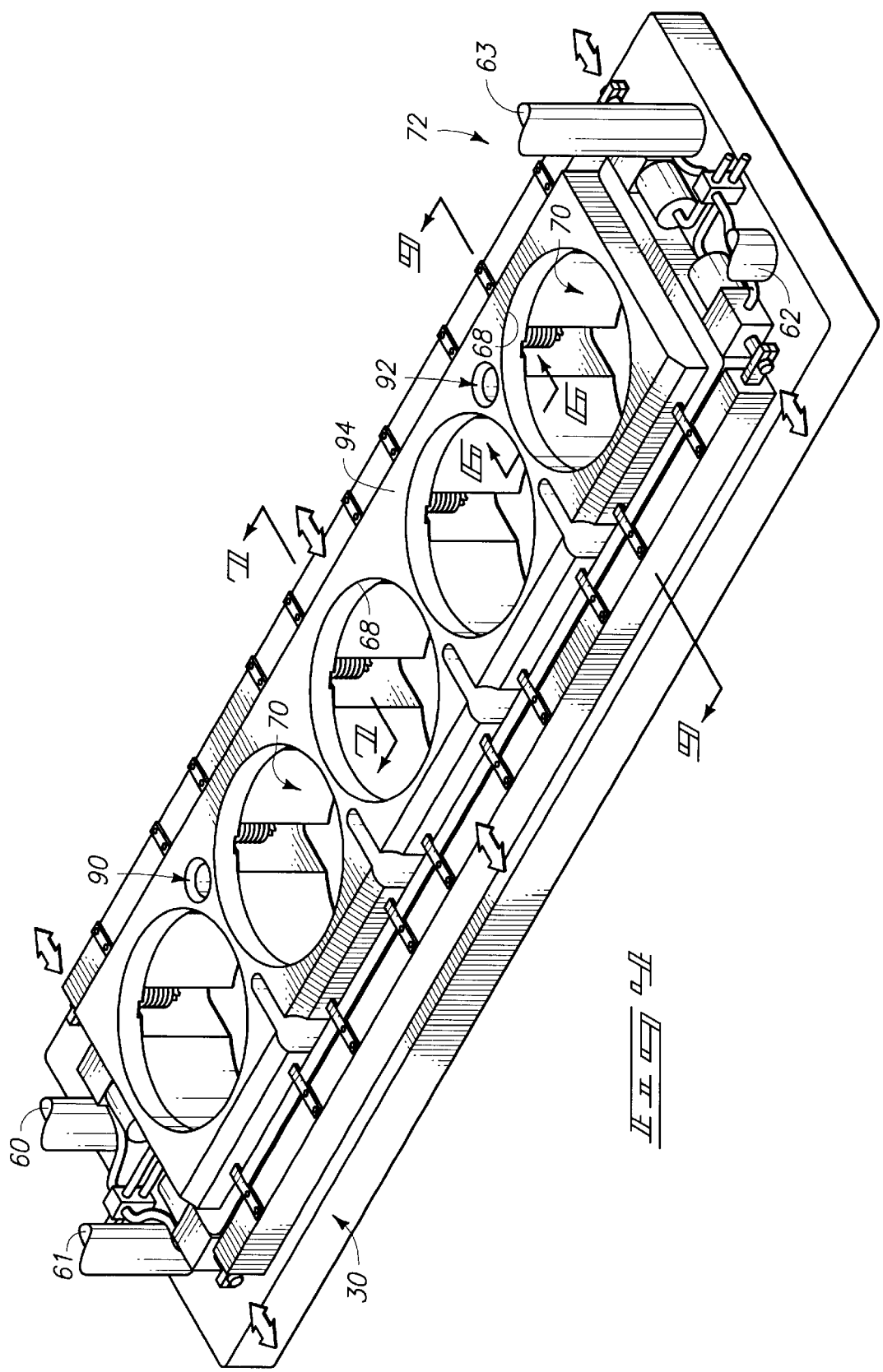
FIG. 4 is a schematic perspective view taken in a generally downwards direction of a bottom platen illustrating associated components of the article registration device configured to cooperate with the components on the top platen of FIG. 3.
Figure 11:
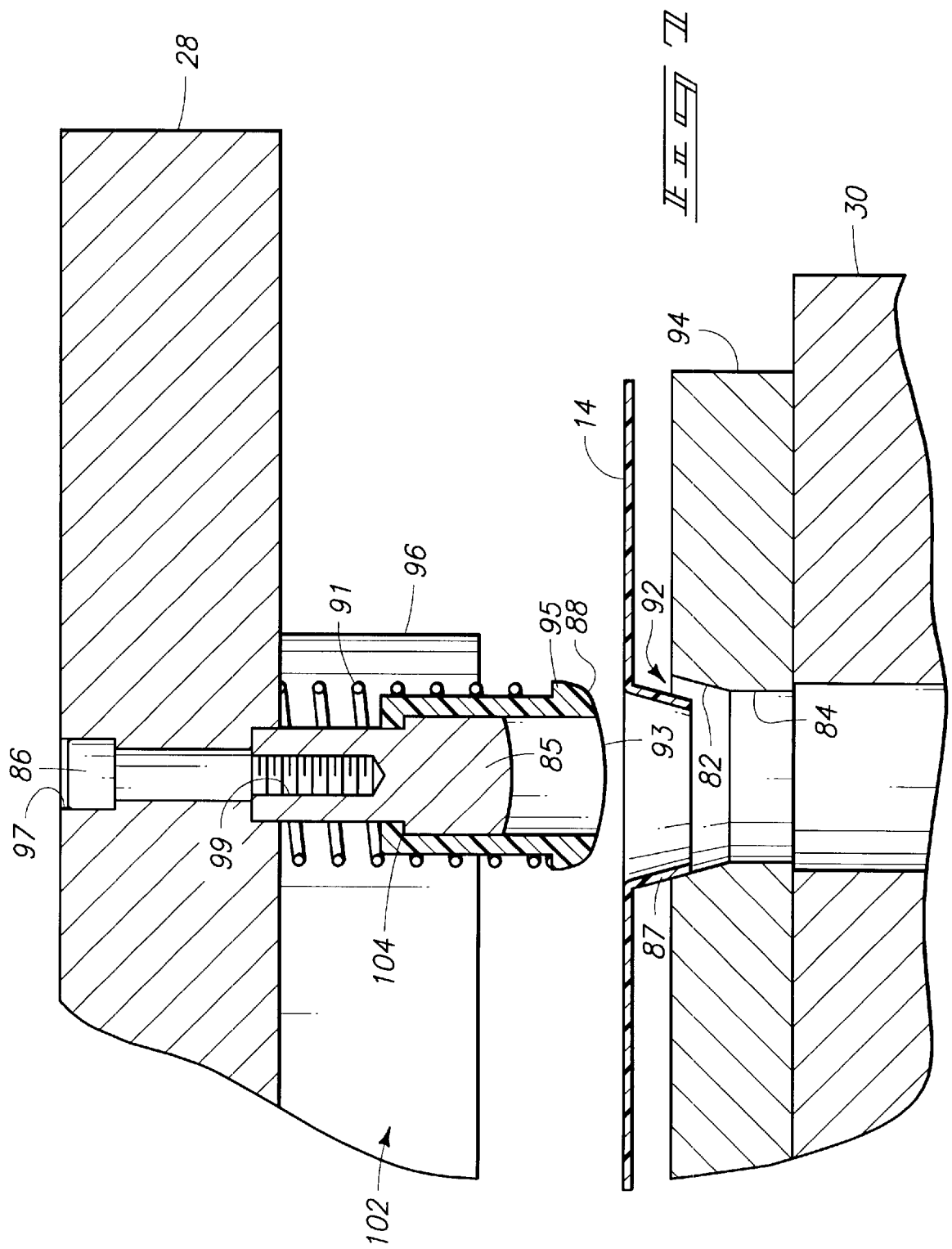
Figure 11:
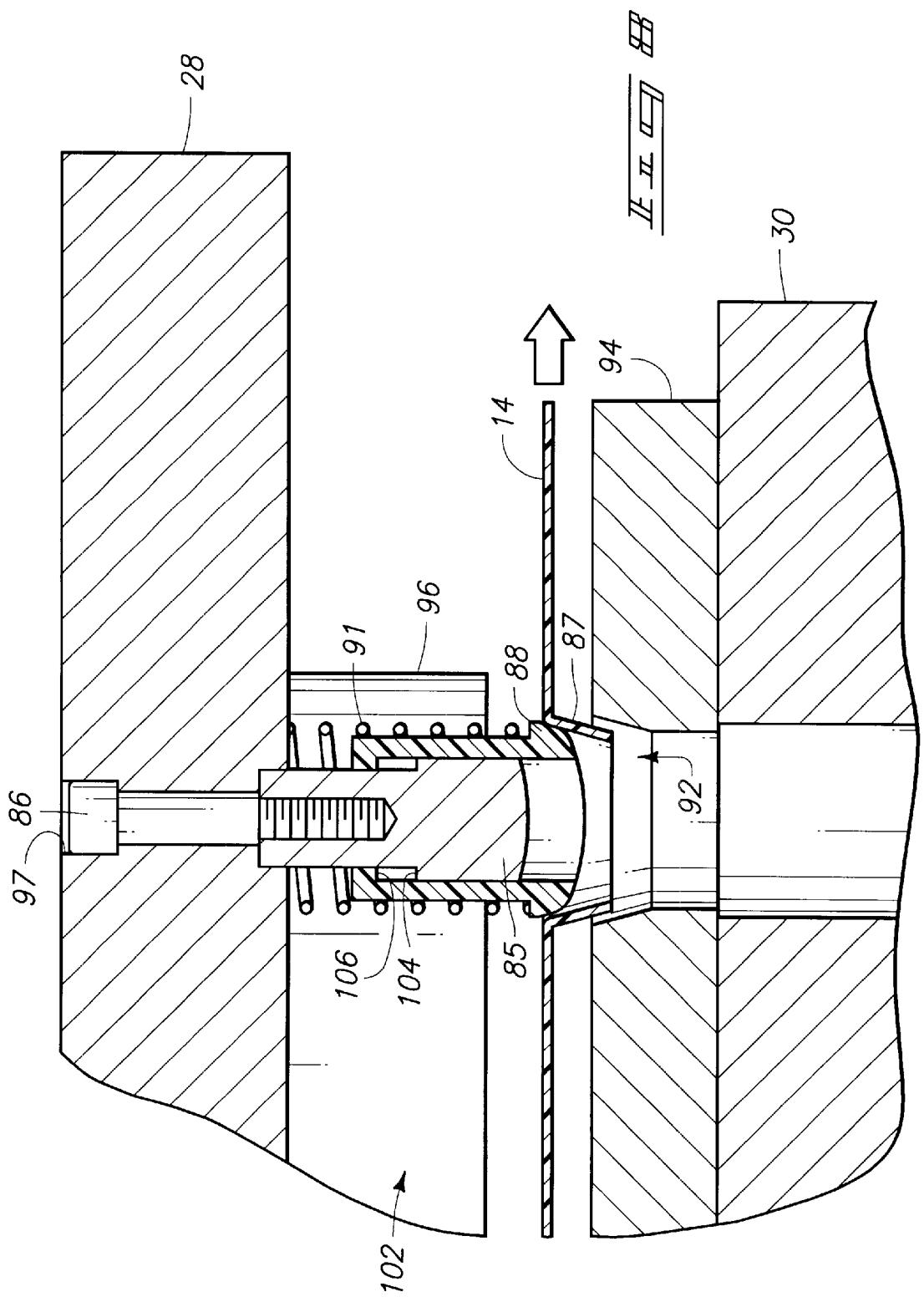

Accordingly, article registration plungers 100 and 102 cooperate with substantially complementary article registration cavities 90 and 92 (of FIG. 4) in order to laterally align a web and corresponding web-formed articles accurately between punch plate 28 (of FIG. 3) and die plate 30 (of FIG. 4). It is understood that such lateral alignment occurs in two dimensions as article locators 87 and 89 taper with depth so as to form a frustoconical or funnel-shaped cavity which imparts alignment to articles 16 (see FIG. 5) in a two-dimensional plane corresponding with the plane of web 14.

As shown in FIG. 5, article registration plunger 100 (as well as plunger 102) cooperates with substantially complementary article registration cavity 92 (as well as cavity 90) in order to align web 14 and articles 16 between die plate 30 and punch plate 28 (of FIG. 3). As shown in FIG. 5, it is understood that plunger 102 is carried for vertical reciprocation by punch plate 28 (of FIG. 3).

FIG. 6 illustrates an alignment and severing operation as carried out between punch plate 28 and die plate 30 when severing individual articles 16 from web 14 by coaction of cutting edges 68 and 98. More particularly, downward movement of plungers 100 and 102 causes aligned registration of tapered article locators 87 and 89 in all directions lying in the plane of web 14. More particularly, plungers 100 and 102 are lowered in a downward axial direction, causing centering of tapered article locators 87 and 89 there about, which also pulls web 14 and articles 16 into aligned registration there about. Such aligned registration of web 14, and cavities 90 and 92 between plungers 100 and 102, and locators 87 and 89, also imparts precise and accurate alignment of articles 16 between cutting edge 98 of punch 96 and cutting edge 68 of individual dies in die member 94. Accordingly, improvements are imparted by increasing the accuracy with which individual articles are severed between punch plate 28 and die plate 30. As shown in FIG. 6, severed articles 16 are released through coaction of gravity through article cavity 70 where they are accumulated there below on an article conveyor (not shown).

FIG. 7 illustrates the assembly of article plunger 102 on a bottom surface of punch plate 28, and the construction of article registration cavity 92 above die plate 30. As shown in FIG. 7, web 14 has been advanced between punch plate 28 and die plate 30 wherein a formed article (not shown) is about to be severed between punch plate 28 and die plate 30. Misalignment is present between such article (not shown) and the associated cutting surfaces of punch plate 28 and die plate 30, as indicated by the misalignment of tapered article locator 87 in relation to article registration cavity 92. It is understood that the positional relationship between an article formed in web 14 and tapered article cavities 87 and 89 corresponds precisely with the positional location of cutting surfaces in punch plate 28 and die plate 30 relative to article registration cavities 90 and 92.

Likewise, plungers 100 and 102 are supported positionally in punch plate 28 in relation to the position of tapered article locators 87 and 89 when articles (not shown) in web 14 are accurately aligned with such cutting edges. Hence, plunger 102 is axially, downwardly displaced such that plunger 102 engages with misaligned tapered article locator 87, causing lateral alignment of locator 87 along with web 14 and any articles formed therein, as illustrated below with reference to FIGS. 8 and 9.

As shown in FIG. 7, plunger 102 (as well as plunger 100) is constructed with an aluminum central retainer 85 having an outwardly biased shoulder 104, a threaded aperture 99, and a hemispherical end portion 93. An ultra-high molecular weight (UHMW) polyethylene, or plastic, outer sleeve 88 is entrapped by central retainer 85 onto punch plate 28. More particularly, a coil steel spring 91 downwardly biases outer sleeve 88 until an inwardly extending shoulder 106 on outer sleeve 88 engages with shoulder 104 of central retainer 85.

In assembly, a threaded fastener 86 is received within a fastener aperture 97 of punch plate 28 so as to retain and assemble plunger 102 onto a bottom surface of plunger plate 28. Spring 91 is compressively biased between a bottom surface of punch plate 28 and a hemispherical circumferential sleeve shoulder 95 of outer sleeve 88. Accordingly, outer sleeve 88 is downwardly biased from punch plate 28, until coaction of plunger 102 causes upward biasing of outer sleeve 88 through coaction with tapered article locator 87 and article registration cavity 92, as shown in FIGS. 8 and 9.

As further shown in FIG. 7, article registration cavity 92 (as well as cavity 90) comprises a frustoconical aperture 82 and a cylindrical aperture 84. According to one construction, hemispherical circumferential sleeve shoulder 95 of outer sleeve 85 tapers inwardly in a radial direction such that downward biasing of plunger 102 into tapered, or tapering, article locator 87 will impart alignment of web 14 and associated articles with respect to frustoconical aperture 82. However, it is understood that frustoconical aperture 82 and hemispherical circumferential sleeve shoulder 95 can have different tapered shapes as long as such tapering imparts alignment as plunger 102 is downwardly biased into tapered article locator 87 and frustoconical aperture 82. Likewise, article locator 87 can optionally have a modified shape, and perhaps even a cylindrical shape if such shape coacts with plunger 102 to cause alignment of articles. Further optionally, plunger 102 can have a relatively square, or flat, head as long as tapering article locator 87 coacts with such head so as to impart alignment of a web and articles therein in response to coaction therebetween.

Figure 9:
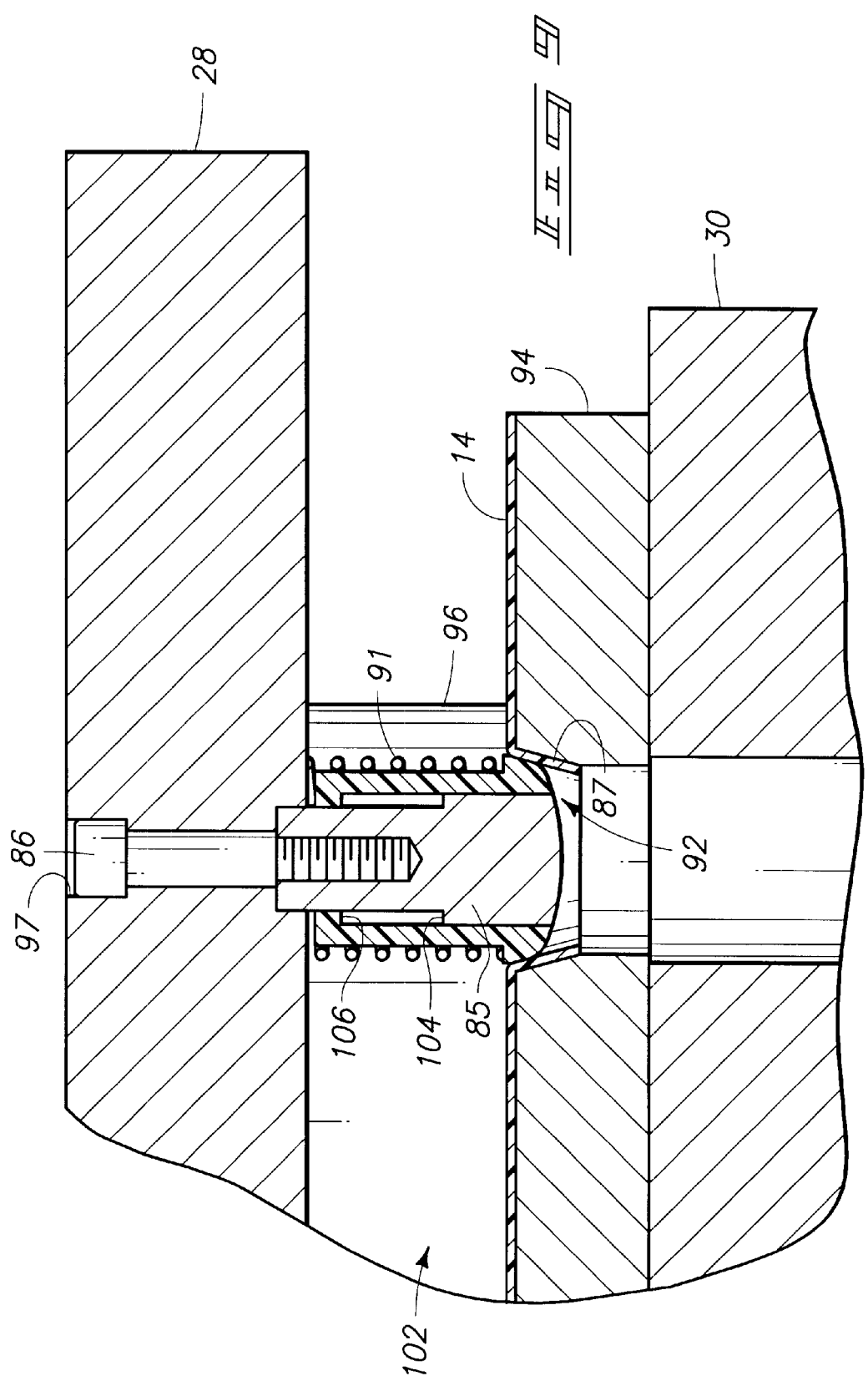
FIG. 9 is an enlarged and partial vertical cross-sectional view taken along line 7—7 of FIG. 5 and corresponding with the views of FIGS. 7 and 8, and illustrating complete closure of the punch plate and die plate during a completed severing operation of an article, wherein the article registration device has aligned the web and articles accurately between the punch plate and die plate during a severing operation.

As shown in FIGS. 7–9, hemispherical end portion 93 and outer sleeve 88 of plunger 102 form a compound curved surface. More particularly, hemispherical circumferential sleeve shoulder 95 has a bifurcated taper including a distal, relatively steep angle taper (relative to the central axis of the plunger) at the leading end and a proximal, relatively shallow angle taper (relative to the central axis of the plunger) toward plate 28. The distal, relatively steep angle taper initiates contact with article locator 87 in order to impart an initial coarse alignment (and large-scale lateral displacement) of articles in web 14. The proximal, relatively shallow angle taper subsequently contacts with article locator 87, as plunger 102 is stroked deeper into article locator 87 and frustoconical aperture 82 in order to impart a subsequent fine alignment (and small-scale lateral displacement) of articles in the web.

In further alternative constructions, it is understood that article registration cavity 92 can comprise a single cylindrical aperture, or other variously shaped, oversize aperture. However, the provision of frustoconical aperture 82 further ensures the accurate alignment of articles in web 14 in relation to cutting surfaces on punch plate 28 and die plate 30.

FIG. 8 illustrates the lowering of punch plate 28 during an article severing operation of a trim press. In such case, plunger 102 initiates engagement with tapered article locator 87, causing lateral alignment of web 14 (and associated articles therein) relative to punch plate 28 and die plate 30. As shown in FIG. 8, plunger 102 initiates contact such that plunger 102 is compressively biased in an upward axial direction as punch plate 28 is lowered further into contact with die plate 30 and finally into complete compression, as illustrated in FIG. 9. Such coaction causes lateral movement of web 14, which causes corresponding article alignment between punch plate 28 and die plate 30.

FIG. 9 illustrates a completely closed stage between punch plate 28 and die plate 30 wherein plunger 102 is completely compressed, and web 14 is accurately aligned therebetween. As shown in FIG. 9, tapered article locator 87 is accurately positioned within article registration cavity 92, which also coincides with accurate registration of articles between cutting edges of punch plate 28 and die plate 30.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A trim press article handling apparatus, comprising:
   a punch plate having a plurality of punches extending across the plate in a direction transverse to a delivery path for a thermoformed web including articles and tapered article locators;
   a die plate having a plurality of dies, each die cooperating in relative movement with a respective one of the punch plates to sever articles from a thermoformable web;
   a pair of plungers carried by one of the punch plate and the die plate spaced apart in a direction transverse to a delivery path for a thermoformed web a distance spanning across a plurality of respective dies or plates, each plunger having a tapered advancing head comprising a central retainer affixed to the respective plate, a biasing spring, and a retractable outer sleeve carried by the central retainer, the outer sleeve biased apart from the respective plate by the biasing spring, the outer sleeve including a hemispherical circumferential sleeve shoulder with a bifurcated taper including a distal, relatively steep angle taper followed by a proximal, relatively shallow angle taper; and
   a pair of receivers, each receiver carried by another of the punch plate and the die plate, having a tapered recess provided rigidly in the another of the punch plate and the die plate, and configured to receive the plunger;
   wherein a tapered article locator within a thermoformed web having articles therein is captured between each pair of the plunger and the receiver as the punch plate and die plate are brought together there about, imparting an initial coarse alignment of articles in the web via the distal, relatively steep angle taper of each plunger cooperating with each receiver between the punch and the die and imparting a subsequent fine alignment of articles in the web via the proximal, relatively shallow angle taper of each plunger cooperating with each receiver.

2. The apparatus of claim 1 wherein the plunger comprises a circumferentially extending hemispherical head portion configured to engage with the tapered article locator to impart internesting alignment therebetween as the plunger is axially biased into engagement with the tapered article locator.

3. The apparatus of claim 1 wherein the plunger is carried for axial movement along the central retainer, wherein a leading end portion of the outer sleeve provides the tapered advancing head.

4. The apparatus of claim 3 wherein the spring comprises a coil spring interposed between the central retainer and the outer sleeve operative to bias the tapered advancing head, wherein engagement of the tapered advancing head with the receiver compresses the spring and imparts axial retraction of the outer sleeve along the central retainer so as to facilitate severing of articles from a web via coacting cutting edges provided on the punch plate and the die plate.

5. The apparatus of claim 1 wherein a pair of the plungers are carried by the punch plate and a pair of the complementary receivers are carried by the die plate, and wherein the punch plate and the die plate are carried for relative axially reciprocating engagement on a trim press.

6. The apparatus of claim 1 wherein the receiver comprises a conical recess.

7. The apparatus of claim 1 wherein the plunger comprises a bifurcated, frustoconical advancing head.

8. The apparatus of claim 1 wherein the central retainer is rigidly affixed to one of the punch plate and the die plate, the outer sleeve is carried for coaxial movement about the central retainer, and the spring urges the outer sleeve away from the one of the punch plate and the die plate, wherein the punch plate and die plate are moved together in axial relation to engage the punch and the die while severing articles such that the outer sleeve engages with a tapered article locator, centering the tapered article locator within the tapered recess of the receiver, and wherein the receiver is provided in the other of the punch plate and the die plate.

9. The apparatus of claim 8 wherein the outer sleeve comprises a plastic outer sleeve having a bifurcated, frustoconical leading end.

10. The apparatus of claim 9 wherein the frustoconical leading end comprises a circumferentially extending hemispherical sleeve shoulder.

11. A tapered article alignment plunger for a trim press article handling apparatus, comprising:
   a central retainer having a fastener receiver and an enlarged shoulder portion, the central retainer arranged to removably affix the retainer to one of a punch plate and a die plate of an article trim press;
   a retractable outer sleeve including a hemispherical circumferential sleeve shoulder and a reduced diameter central body, a bore provided through the outer sleeve with an inwardly extending shoulder provided opposite the hemispherical end, the outer sleeve telescopically received about the central retainer, with the enlarged shoulder portion of the central retainer cooperating with the inwardly extending shoulder portion of the outer sleeve to retain the outer sleeve on the central retainer when the outer sleeve is telescopically biased away from the one of a punch plate and a die plate, the outer sleeve including a hemispherical circumferential sleeve shoulder with a bifurcated taper inwardly in a radial direction including a distal, relatively steep angle taper followed by a proximal, relatively shallow angle taper such that forward biasing of the plunger into a tapered article locator in a thermoformed web with articles imparts alignment of the web, the articles, and the article locator relative to the plunger; and
   a biasing spring configured to engage at a first end with the enlarged shoulder portion of the central retainer and at a second end with the one of a punch plate a die plate onto which the alignment plunger is mounted.

12. The tapered article alignment plunger of claim 11 wherein the central retainer comprises a metal post, and the retractable outer sleeve comprises a plastic, hemispherical end piece that is removably received about the central retainer to facilitate replacement of the outer sleeve to facilitate at least one of maintenance and reconfiguration of a desired tapered geometry of the hemispherical end piece.

* * * * *

UNITED STATES PATENT AND TRADEMARK OFFICE
CERTIFICATE OF CORRECTION

PATENT NO. : 6,435,067 B1
DATED : August 20, 2002
INVENTOR(S) : Jere F. Irwin

It is certified that error appears in the above-identified patent and that said Letters Patent is hereby corrected as shown below:

Column 2,
Line 9, delete "a method is provided", and insert -- a method provided --.

Column 3,
Line 50, delete "more accurately position", and insert -- more accurately positions --.

Column 10,
Line 52, delete "one of a punch plate a die plate", and insert -- one of a punch plate and a die plate --.

Signed and Sealed this

Thirty-first Day of December, 2002

JAMES E. ROGAN
*Director of the United States Patent and Trademark Office*